United States Patent [19]

Rominek

[11] Patent Number: 5,752,383
[45] Date of Patent: May 19, 1998

[54] AIR TURBINE FLOW RESTRICTOR

[75] Inventor: Jon P. Rominek, Tempe, Ariz.

[73] Assignee: AlliedSignal Inc., Morris Township, N.J.

[21] Appl. No.: 748,846

[22] Filed: Nov. 14, 1996

[51] Int. Cl.$^6$ .................. F16D 31/02; F02C 7/26
[52] U.S. Cl. .................. 60/407; 60/468; 60/494; 60/39.142; 60/39.23; 60/403; 415/19; 415/36
[58] Field of Search .................. 60/407, 468, 494, 60/39.142, 39.23, 39.29, 403; 415/19, 26, 36

[56] References Cited

U.S. PATENT DOCUMENTS

| | | |
|---|---|---|
| 2,679,991 | 6/1954 | Eagon .................. 244/74 |
| 2,874,540 | 2/1959 | Esmeier et al. .................. 60/39.091 |
| 3,021,672 | 2/1962 | Ferguson, Jr. et al. .................. 60/39.142 |
| 3,156,229 | 11/1964 | Manning .................. 60/39.142 X |
| 3,470,691 | 10/1969 | Smith .................. 415/19 X |
| 3,534,548 | 10/1970 | Connors .................. 60/34.092 |
| 4,571,945 | 2/1986 | Inada et al. .................. 415/36 X |
| 5,160,005 | 11/1992 | Burch . |
| 5,435,125 | 7/1995 | Telakowski .................. 60/39.142 |

*Primary Examiner*—Hoang Nguyen
*Attorney, Agent, or Firm*—Jerry J. Holden

[57] ABSTRACT

An air turbine flow restrictor comprises a sensor for determining the rotational velocity of the turbine wheel. In response to a detected speed above a predetermined threshold, particles are injected into the inlet airstream. In one embodiment of the invention, the particles are metal disks. The disks, carried by the airstream become lodged in the nozzles of the air turbine, thereby restricting the flow of air to the turbine wheel.

12 Claims, 4 Drawing Sheets

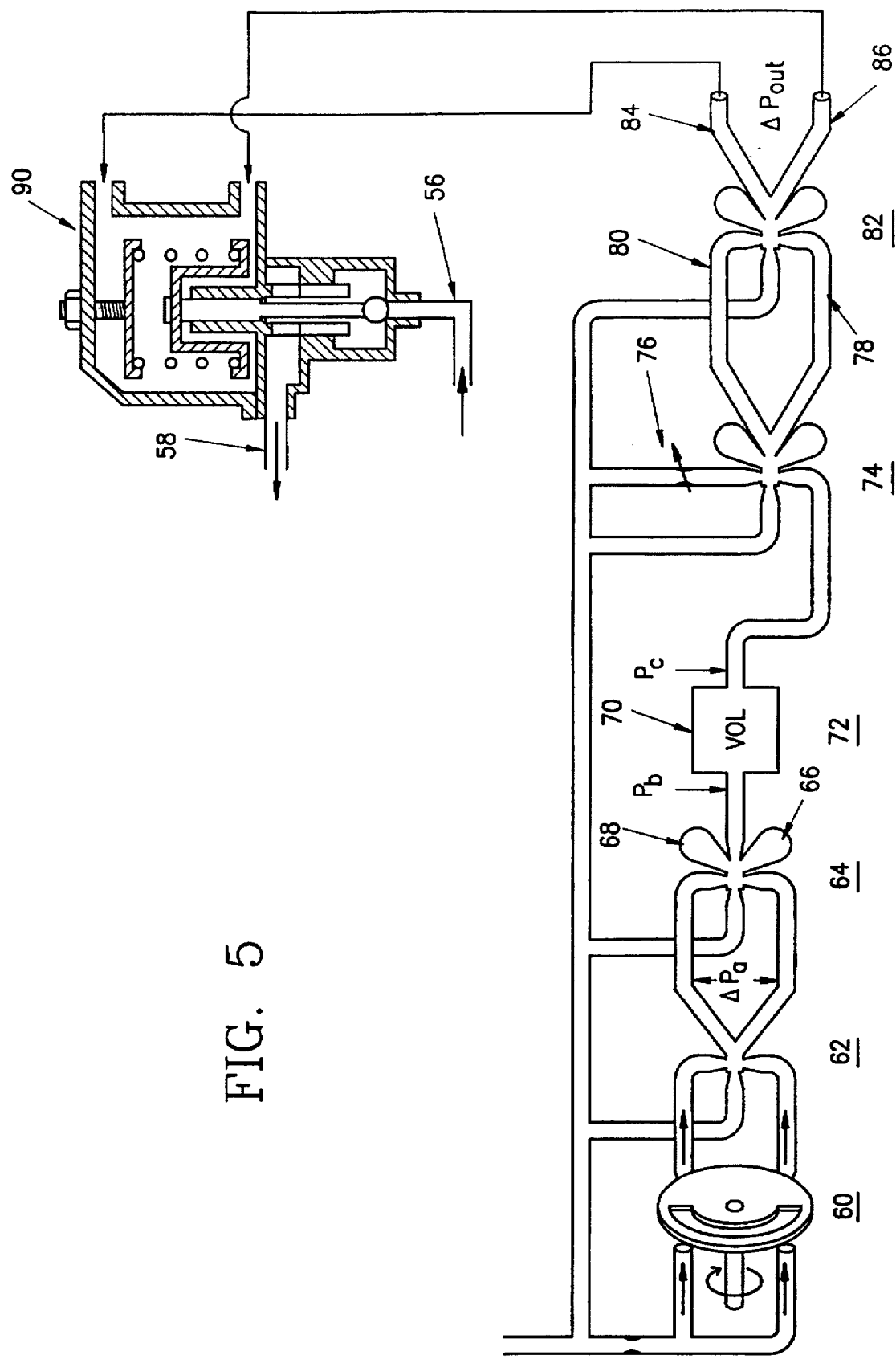

AIR TURBINE FLOW RESTRICTOR

FIELD OF THE INVENTION

The invention pertains to air turbines in general, and to air turbine starters, in particular.

BACKGROUND OF THE INVENTION

Air turbine starters are well known in the aviation field and are commonly used to start gas turbine propulsion engines of various types. The air turbine starter typically comprises a turbine wheel coupled to a gear reduction train, the output of which is coupled to the shaft of the propulsion engine or other load.

Pressurized air provides the motive force for driving the air turbine starter. For aircraft propulsion engine starting, the air turbine starter may receive pressurized air from an auxiliary source aboard the aircraft, from another propulsion engine of the aircraft, or pressurized air may be provided by a portable ground start cart. When supplied with pressurized air, the air turbine starter accelerates the propulsion engine from a stop to and beyond its self-sustaining speed. Even after the propulsion turbine engine attains self-sustaining speed, torque is continued to be delivered from the air turbine starter to assist acceleration of the propulsion engine toward its operating speed range. When the air turbine starter reaches its cut-out speed, the supply of pressurized air is cut off by closing a valve between the air supply and starter. The propulsion engine continues to accelerate toward its operating speed, while a centrifugal clutch or similar mechanism disengages the air turbine starter from the propulsion engine. This prevents the propulsion engine from back driving the air turbine starter above its cut-out speed.

Occasionally, the air supply valve may fail to cut off the air supply after the air turbine starter has been disengaged from the propulsion engine. Alternatively, a failure in the gear train may cause the turbine wheel to become disengaged from the load. In either event, the air turbine starter is essentially freerunning at maximum power. Although the runaway speed of the turbine is limited to some extent by the inherent decrease in turbine nozzle to blade efficiency at speeds above the design speed, the steady state runaway speed is substantially above the maximum designed operating speed. As a result, freerunning the starter leads to premature wear of the turbine wheel and other rotating parts, and may potentially lead to a failure of the turbine wheel itself.

Prior art solutions to the foregoing problem have consisted chiefly of designing the turbine wheel to withstand sustained freerun speeds, and designing the turbine housing to withstand a catastrophic failure of the turbine wheel. Both of these solutions necessitate added cost and weight. Moreover, safety considerations generally dictate that even where the turbine wheel is designed to withstand a freerun, the air turbine starter must be overhauled and the turbine wheel replaced after a single incident in which the turbine wheel was actually exposed to a freerun speed.

Accordingly, what is needed is a fail-safe apparatus for preventing an air turbine starter from experiencing a freerun condition even if the air supply valve fails to close while the air turbine starter is disengaged from the load. What is also needed is such a device that will not add substantial size, weight, or cost to the air turbine starter as would be inherent in adding a redundant air supply valve, vent, or similar means for shutting off or diverting the air supply.

SUMMARY OF THE INVENTION

In accordance with the principles of the invention, a freerun condition is prevented by sensing the speed of the turbine wheel and, in response to the detected speed being above a predetermined threshold, introducing a supply of obstructions into the airstream upstream of the turbine. The obstructions, which may comprise foam or individual solid particles, are carried by the airstream to become lodged in the turbine nozzles or elsewhere in the airflow passage upstream of the turbine wheel. The obstructions restrict the airflow to the turbine and thereby limit the freerun speed.

In accordance with one embodiment of the invention, an air turbine flow restrictor injector is provided. The injector comprises a reservoir of metallic discs attached to the air turbine air supply passage of the air turbine. The injector includes a piston which when activated urges the metallic disks out of the reservoir and into the airstream to become lodged in the turbine nozzles.

BRIEF DESCRIPTION OF THE DRAWING

The present invention will be better understood from a reading of the detailed description, taken in conjunction with the accompanying drawing in which references designate like elements and, in which:

FIG. 5 is a schematic of a control circuit incorporating certain features of the present invention.

DESCRIPTION OF PREFERRED EMBODIMENTS AND METHODS

Figure 1:
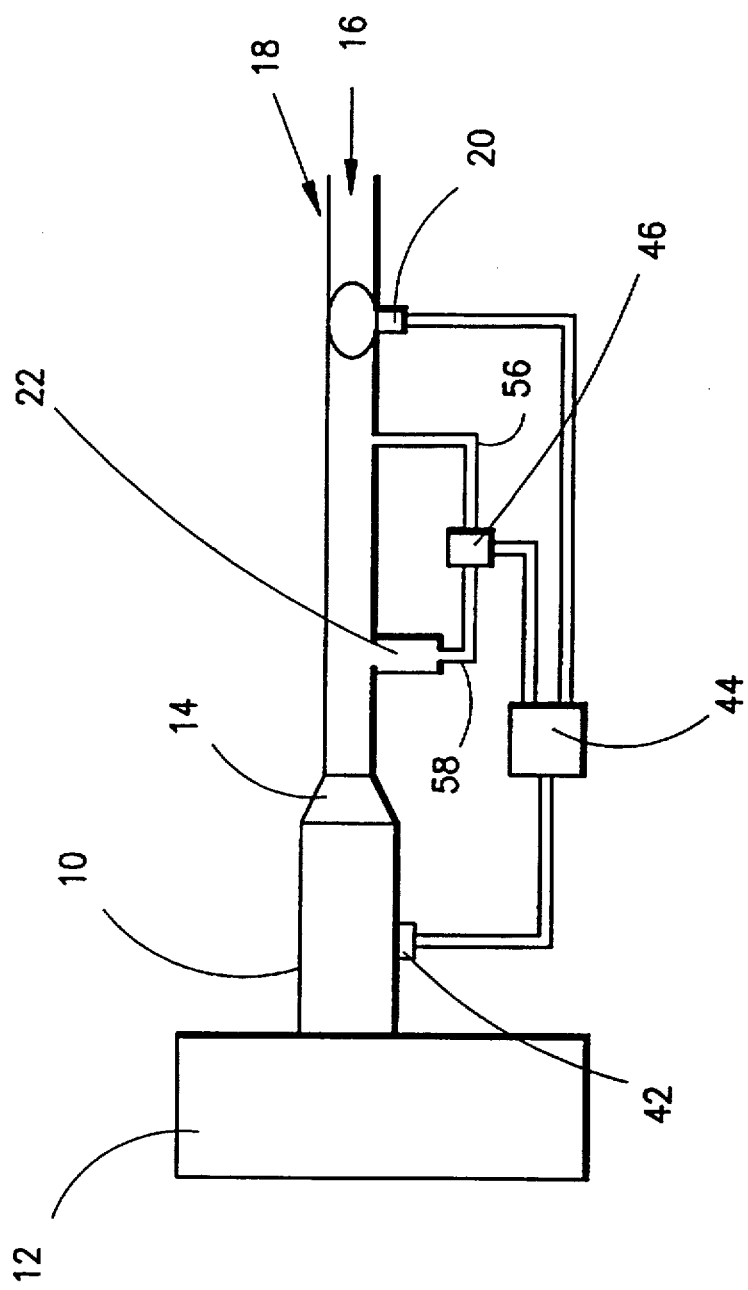
FIG. 1 is a schematic of an air turbine starter in accordance with the principles of the invention.

FIG. 1 is a schematic showing a conventional air turbine starter 10 attached to a load 12, which may be the gearbox of a stationary turbine, the input shaft of an aircraft propulsion engine, or other rotating machinery. The air turbine starter 10 includes an inlet 14, which is connected to a pressurized air supply 16 via conventional duct 18. A conventional start valve 20 selectively opens to admit the pressurized air into the air turbine starter inlet in response to a command to engage the air turbine starter. Start valve 20 is also designed to close to prevent the pressurized air from entering the air turbine starter inlet when the air turbine starter is not in use, or when it has reached its cut-out speed. A flow restrictor injector 22 is preferably mounted directly to the duct 18 upstream of the air turbine starter inlet 14, but may be mounted in any configuration, provided the outlet of the injector 22 is in fluid communication with the bleed air supply duct 18 upstream of the air turbine starter inlet 14.

Figure 2:
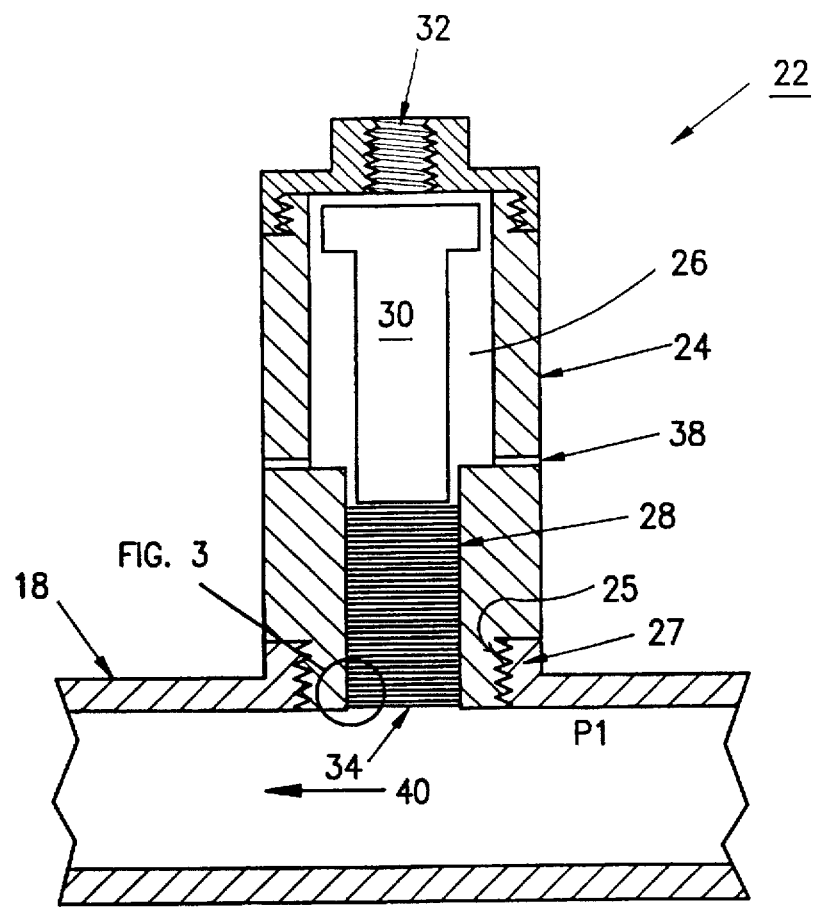
FIG. 2 is a cross-sectional view of a flow restrictor injector in accordance with the principles of the invention.

With reference to FIG. 2, in the preferred embodiment, the flow restrictor injector 22 comprises a housing 24 defining a reservoir 26, having threaded portion 25 which is threaded into a port 27 in the duct 18. The reservoir 26 is partially filled with a plurality of solid particles, which may be spheroids or irregular shapes, but in the present embodiment comprise a plurality of cylindrical disks 28 arranged in a stack, which is more clearly shown in FIG. 3. Since in many applications the compressed air used to operate the air turbine starter is in excess of 400°–450° F., preferably the particles are a metal alloy, however, synthetic materials may be suitable for applications where the particles would not be exposed to such high temperatures.

Figure 4:
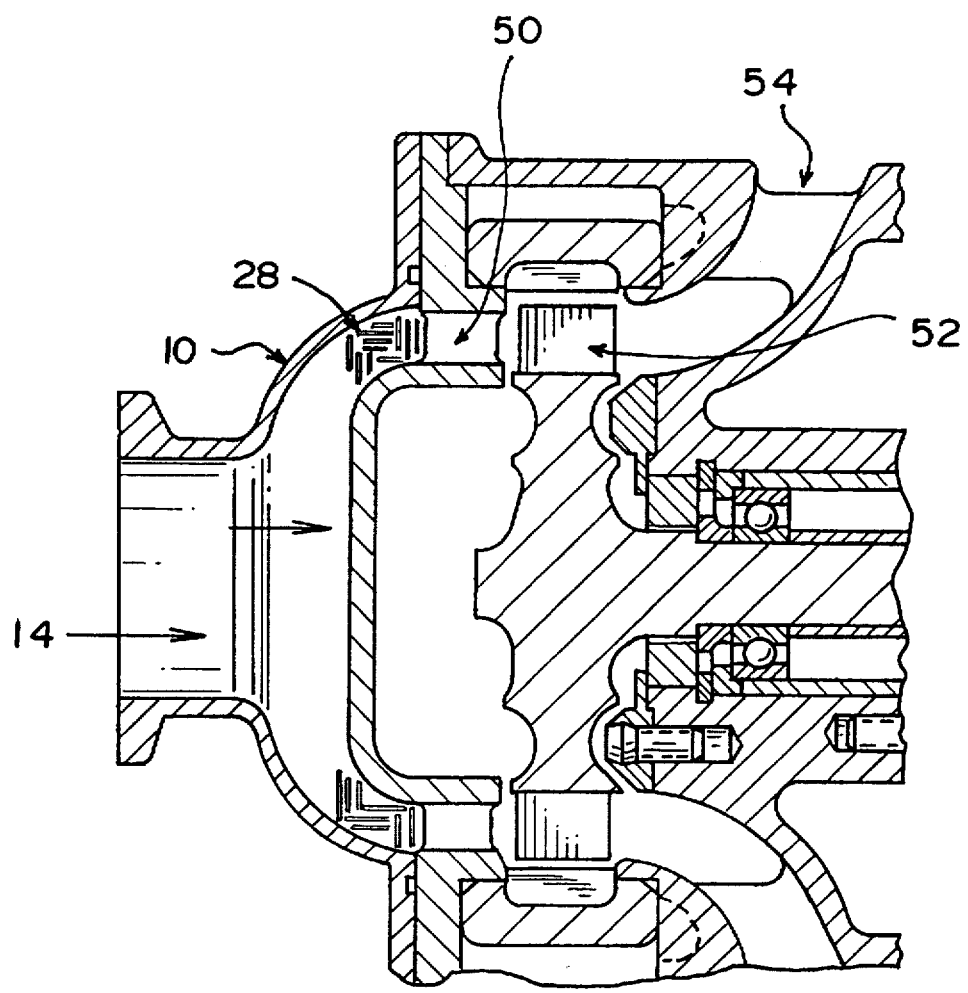
FIG. 4 is a partial cross-sectional view of an air turbine starter illustrating certain features of the present invention.

FIG. 4 is a partial cross section of the air turbine starter 10. Air flows along an airflow path from inlet 14, through nozzles 50, past turbine wheel 52, where energy is extruded from the airflow and converted into mechanical work, and out exhaust ports 54. In the event of a freerun turbine condition, the disks 28 injected by flow restrictor injector 22 lodge in the airflow path at nozzles 50 to impede the flow of air through the nozzles. Although in the present embodiment the nozzles 50 are the narrowest section upstream of the turbine wheel, it would be possible to include a restriction elsewhere in the airflow path. Accordingly, the term nozzle, as used herein, is intended to refer to any restriction in the airflow path upstream of the turbine wheel where the injected disks 28 can lodge to restrict the airflow.

The precise dimensions and materials used for the cylindrical disks 28 are determined by the airstream temperature, pressure, and size of the air turbine starter. For example, for a ATS100-457 model air turbine starter having a minimum nozzle dimension of 0.607 inch, operated using 46 psi air at 400° F., the stack 28 contains 200 disks, with each disk having a thickness of 0.015 inch and a diameter of 0.720 inch. Importantly, the particles or disks 28 are each sized so as to be incapable of individually passing through the nozzles 50.

The stack of cylindrical disks 28 are likely to be stored in the reservoir 26 of injector 22 for a protracted period of time under ambient conditions, where they will be exposed to heat and moisture in the air stream. Accordingly, some measures should be taken to prevent corrosion from forming a bond between the individual disks, which would impede the disks' ability to scatter to obstruct the nozzles when injected into the airstream. Accordingly, a corrosion resistant steel, such as 300 series stainless steel, is a preferred choice for the disks based on considerations of cost versus strength, and based on the need for corrosion resistance. For additional assurance against moisture causing a corrosion bond, a graphite powder is preferably applied to the disks.

Figure 3:
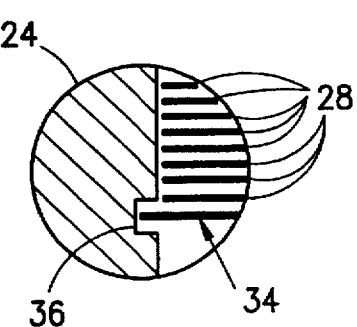
FIG. 3 is an enlarged partial cross section of the flow restrictor injector of FIG. 2.

The stack of disks may be retained in the reservoir 26 by any conventional means such as a ring-detent, a ferrous retaining disk retained by a magnetic insert (not shown) in housing 24, or as shown in more detail in FIG. 3, the stack of disks 28 may be retained by a retaining disk 34, which is of slightly larger diameter than the remaining disks and which is pressed into a groove 36 in housing 24. Immediately above the stack of disks is a piston 30 (shown in FIG. 2), or other actuator which is capable of overcoming the resistance of the retaining disk 34 and urging the stack of disks into duct 18. Housing 24 may be equipped with vents 38 to prevent pressure from building inside reservoir 26.

Referring again to FIGS. 1 and 4, a suitable control circuit for use with the flow restrictor injector 22 comprises a hall effect transducer or other conventional turbine speed transducer 42 to generate a speed signal representative of the speed of rotational velocity of the turbine. The speed signal is coupled to a microprocessor controller or other conventional electronic control unit 44. Electronic control unit 44, which may also control the start valve 20, monitors the speed signal for an overspeed condition. In the event the speed signal indicates a speed that exceeds a predetermined value, the control unit 44 activates a solenoid valve 46, which opens to admit pressure from inlet duct 56 into output duct 58 which is in fluid communication with port 32 of injector 22. The pressure admitted at port 32 causes piston 30 to urge the disks 28 into the airstream 40 in duct 18. The airstream 40 carries the individual disks 28 through starter inlet 14 until they lodge just upstream of the nozzles 50 as shown in FIG. 4. Once lodged, the disks 28 restrict the airflow to the nozzles 50, thereby reducing the rotational speed of the turbine wheel 52. It should be appreciated that the over speed condition that triggers the present invention is an emergency situation that rarely occurs. Consequently, after each operation the air turbine starter is taken apart and the disks removed. These disks, or new disks, are then reloaded into the reservoir 26.

FIG. 5 depicts an alternative embodiment having a fluidic control circuit also suitable for use in lieu of the foregoing electronic control circuit. A pneumatic chopper 60 is driven at a speed proportional to the speed of turbine wheel 52. The output of chopper 60 comprises two fluidic signals 180° out-of-phase, which are amplified by a fluidic bistable amplifier 62. The output of the bistable amplifier is used as the control signal for a fluidic inverting rectifier 64. The inverting rectifier 64 diverts the source pressure into one of vents 66 or 68 when there is a steady state signal from the bistable amplifier 62 and produces an output pulse 70 whenever the control signal from the bistable amplifier 62 reverses polarity. Thus, the output of the bistable amplifier 62 is a series of pulses of approximately equal duration, the frequency of which is proportional to the turbine speed. The output of the bistable amplifier 62 is smoothed in an integrating volume 72 then used as a control input in a fluidic proportional amplifier 74. The other control input to the amplifier 74 is a fixed calibrated flow 76 used as a bias signal.

If the output from the integrating volume 72 is less than the fixed calibrated flow 76, a proportionally greater amount of the source flow is diverted along channel 78 where it is amplified by an additional proportional amplifier 82 into a pressure signal in which the pressure in branch 84 is proportionally greater than the pressure in branch 86. Accordingly, the pneumatic control valve 90 is biased in the closed direction. Conversely if the output from the integrating volume 72 is greater than the fixed calibrated flow 76, a proportionally greater amount of the source flow is diverted along channel 80 where it is amplified by an additional proportional amplifier 82 into a pressure signal in which the pressure in branch 86 is proportionally greater than the pressure in branch 84. When the pressure differential is sufficient to overcome the initial bias in the pneumatic control valve 90, the control valve 90 opens to permit the source pressure in inlet duct 56 into output duct 58 to reach the piston 30 of the flow restrictor injector 22. In response to the pressure in duct 58, piston 30 urges the flow restrictor disks 28 into the airstream as hereinbefore described.

Although certain preferred embodiments and methods have been disclosed herein, it will be apparent to those skilled in the art that variations and modifications of such embodiments and methods may be made without departing from the spirit or scope of the invention. For example, an injectable foam may be used in place of the flow restrictor disks where the temperature of the pressurized air permits. Similarly, other electronic, fluidic, or other control circuits may be substituted for the control circuits described above. Accordingly, it is intended that the invention shall be limited only to the extent required by the appended claims and the rules and principles of applicable law.

What is claimed is:

1. An air turbine starter comprising:
   a housing defining an inlet, an outlet, and a gas flow path communicating said inlet with said outlet for conveying a flow of pressurized gas therebetween, said gas flow path further including a plurality of nozzles along a portion thereof;
   a turbine journaled in said housing and operatively interposed in said flow path adjacent said nozzles for extracting work from said flow of pressurized gas;

a flow restrictor injector;

a sensor for sensing rotational velocity of said turbine;

a control circuit responsive to said sensor for activating said flow restrictor injector when said rotational velocity exceeds a predetermined threshold; and said flow restrictor injector comprising:

a reservoir having an exit opening in fluid communication with said inlet;

a plurality of particles contained in said reservoir, said plurality of particles each sized so as to be incapable of individually passing through said nozzles; and means responsive to said control circuit for initiating a flow of said particles through said exit opening into said inlet for substantially obstructing said nozzles.

2. The air turbine starter of claim 1 wherein said plurality of particles comprises a plurality of metallic spheres.

3. The air turbine starter of claim 1 wherein said plurality of particles comprises a plurality of metallic disks.

4. The air turbine starter of claim 1 wherein said means for initiating a flow comprises a piston for urging said plurality of particles through said exit opening.

5. The air turbine starter of claim 1 wherein said sensor comprises an electronic sensor having a sensor output responsive to said rotational velocity and said control circuit comprises an electronic circuit having an input operatively connected to said sensor output and an output operatively connected to said flow initiating means.

6. The air turbine starter of claim 1 wherein said sensor comprises a fluidic sensor having a sensor output responsive to said rotational velocity and said control circuit comprises a fluidic circuit having an input operatively connected to said fluidic sensor output and an output operatively connected to said flow initiating means.

7. An aerodynamic flow restrictor apparatus for preventing excessive speed in an air turbine starter having a gas flow path including an inlet and a plurality of nozzles adjacent a turbine wheel, said apparatus comprising:

a sensor for sensing rotational velocity of said turbine wheel;

a reservoir having an exit opening in fluid communication with said inlet;

a plurality of particles contained in said reservoir, said plurality of particles each sized so as to be incapable of individually passing through said nozzles; and an actuator responsive to said sensor for initiating a flow of said particles through said exit opening into said inlet for substantially obstructing said nozzles.

8. The apparatus of claim 7 wherein said plurality of particles comprises a plurality of metallic disks.

9. The apparatus of claim 7 wherein said actuator comprises a piston for urging said plurality of particles through said exit opening.

10. The apparatus of claim 7 wherein said sensor comprises an electronic sensor having a sensor output responsive to said rotational velocity and an output operatively connected to said actuator.

11. The apparatus of claim 7 wherein said sensor comprises a fluidic sensor having a sensor output responsive to said rotational velocity and an output operatively connected to said actuator.

12. A method for regulating speed of an air turbine having an inlet, an outlet and a turbine wheel operatively disposed between said inlet and said outlet, said turbine further including a plurality of nozzles adjacent said turbine wheel, said method comprising:

storing a plurality of solid particles in a reservoir proximal to said inlet, said solid particles each sized so as to be incapable of individually passing through said nozzles;

sensing rotational velocity of said turbine wheel;

discharging said plurality of solid objects from said reservoir into said inlet, in response to said sensed rotational velocity exceeding a predetermined limit, where said solid particles at least partially obstruct said nozzles to limit said rotational velocity.

* * * * *